Nov. 3, 1959 M. R. URIST 2,910,978
HIP SOCKET MEANS
Filed March 28, 1955
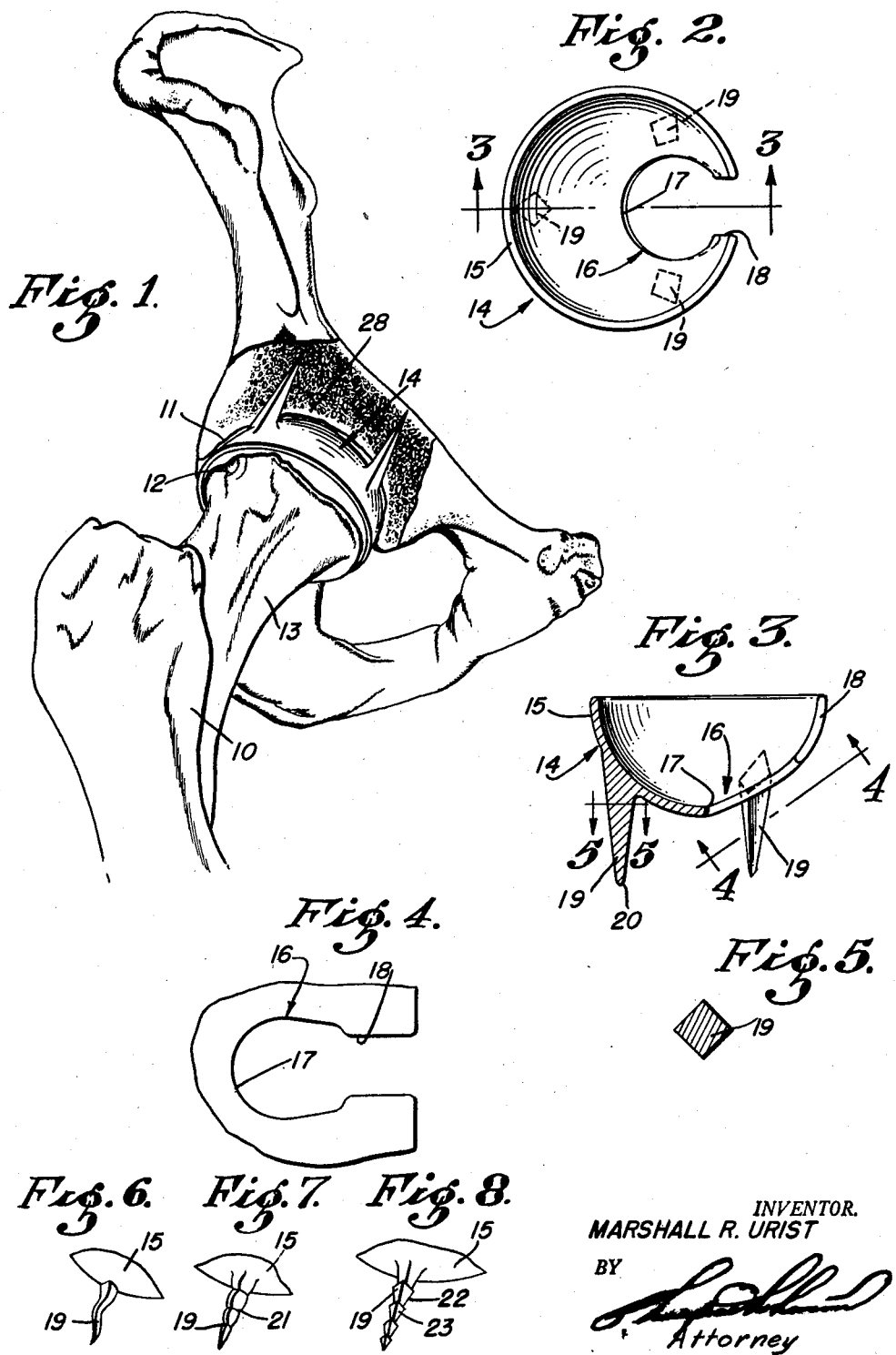
INVENTOR.
MARSHALL R. URIST
BY
Attorney

United States Patent Office 2,910,978
Patented Nov. 3, 1959

2,910,978

HIP SOCKET MEANS

Marshall R. Urist, Los Angeles, Calif.

Application March 28, 1955, Serial No. 497,285

10 Claims. (Cl. 128—92)

The present invention relates generally to an improved hip socket, and is more particularly concerned with a hip socket structure that is so fabricated that it may be permanently positioned in the acetabulum of the hip joint so as to form a substitute or replacement lining.

Heretofore, various approaches have been made in an endeavor to arrive at a solution to the problem of rehabilitating a hip joint which has become impaired by arthritis or other injury which might prevent its normal functioning.

In this connection, a number of techniques have been tried which involve a total replacement of the ball at the head of the femur. In the main, the replacement balls are constructed of suitable metal or other material and are usually provided with an anchoring shank or shaft structure which is arranged to be mounted in a bored or drilled passage in the oblique neck portion at the head of the femur. With an installation of this type, the bone structure is necessarily weakened and in time the bone gives way due to abnormal stresses being applied to the bone structure in an unnatural manner. As a consequence, this technique has not proved too satisfactory.

Another approach has been to provide a cup or cap, which may be molded or otherwise formed to fit over the ball surface area which normally contacts the associated socket of the hip joint. These cups or caps are usually unanchored and are relatively movable with respect to the contacting surfaces of the ball and socket. This approach likewise has not been entirely successful for the reason that a joint system is formed which is not entirely stable, and where this technique has been followed, the person must utilize assistance in walking.

While the above mentioned techniques have been utilized primarily with respect to the ball element of the hip joint, another approach has been to utilize a cup lining in the socket element of the joint, this lining being fastened by screws. In the main, this arrangement has proved unsatisfactory also for the reason that vibrations ultimately cause the screws to become loosened, with the result that the joint manipulation is seriously hampered.

Being mindful of the difficulties experienced in the above noted attempts to solve the problem, it is proposed in the present invention to provide a cup-shaped socket which is so arranged that it may be permanently anchored in the acetabulum to form a fixed lining which will receive the head of the femur therein in as natural a position as possible so that the stresses will continue to act in the joint elements in substantially the same manner as found in a healthy joint. Thus, a more stable assemblage will be obtained than is normally capable by existing techniques.

A further object is to provide an improved socket member for installation in the socket element of a ball and socket joint, the socket member being constructed with an opening which will permit the passage of normal joint lubricating secretions to the relatively movable joint surfaces in a natural and unobstructed manner.

Another object is to provide as an article of manufacture, a cup-shaped socket liner for the socket element of a ball and socket joint, this liner having integrally formed anchors which are adapted to fixedly secure and retain the socket liner in position without the possibility of becoming loosened due to vibrations in the joint structure.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a view showing the anatomical relationship of the joint elements of a hip joint to which the socket of the present invention has been applied, portions of the bone structure of the pelvis being removed to show mounting and anchoring parts;

Fig. 2 is a plan view of the socket member;

Fig. 3 is a sectional view, taken substantially on line 3—3 of Fig. 2;

Fig. 4 is an enlarged fragmentary plan layout of the notch as seen substantially from line 4—4 of Fig. 3;

Fig. 5 is a transverse section through one of the anchoring spikes of the member, taken substantially on line 5—5 of Fig. 3;

Fig. 6 is a fragmentary perspective view showing a modified spike construction;

Fig. 7 is another spike modification; and

Fig. 8 is still another modification.

Referring now to the drawings generally, for illustrative purposes there has been disclosed in Fig. 1 a ball and socket joint as exemplified by a hip joint. More specifically, the hip joint comprises a thigh bone or femur 10 which articulates at its upper end with the hip bone or acetabulum 11 by a rounded ball or head 12 connected with the shaft of the bone by an oblique neck 13.

In a healthy joint, relative movement is permitted of the head 12 in the acetabulum. This freedom of movement may become obstructed in certain diseased conditions or by injuries to the joint structure. As for example, in arthritic conditions osteophytes or so-called barnacles may be formed around the peripheries of the ball and socket elements to such an extent that freedom of movement in the joint becomes impaired. Under such conditions, the joint may be rehabilitated according to the present invention by means of a substitute or replacement lining in the form of a cup-shaped socket member, as generally indicated by numeral 14, and which will hereinafter be described in detail.

As shown in Fig. 2, the socket member 14 comprises a cupped shell 15 of suitable metallic material. The shell is of substantially hemispherical configuration and the shell wall is shown as being of uniform thickness.

Referring to Figs. 2, 3, and 4, it will be seen that the shell wall is provided with a notch, as generally indicated by the numeral 16, which extends from the central axis of the cup and opens into the shell brim. In configuration, this notch has an enlarged inner end portion 17 which connects with a contracted neck portion 18 at the rim margin. The purpose of this notch will subsequently be explained.

The socket member is provided with a plurality of anchoring spikes 19 which exteriorly project from the bottom of the shell 15, the longitudinal axes of these spikes being in parallel relation with the central axis of the shell. Each of these spikes is of square cross-section, as shown in Fig. 5, and is gradually tapered from the shell to a pointed end 20.

In the embodiment shown, three spikes 19 are integrally formed with the shell wall and the spikes are symmetrically positioned at the corners of an equilateral triangle in 120° angular spacing about the center line of the shell. Two of the spikes are positioned on opposite sides respectively of the notch 16, while the remaining spike is diametrically aligned with the axis of the notch, as clearly shown in Fig. 2.

While the embodiment just described utilizes spikes with plane surfaces, it is to be understood that other types of surfaces may be utilized. Modified surface constructions are shown in Figs. 6, 7 and 8.

In general, the surfaces of the spikes shown in Figs. 6, 7 and 8 are of undulated form, but differ mainly in the manner in which the undulations are obtained. In the form shown in Fig. 6, the spike is deformed to provide a wavy axis. In the arrangement shown in Figs. 7 and 8, the axis is linear, and the surfaces are provided with notches. In Fig. 7 notches 21 are provided in each side surface, the material between successive notches being rounded. In the arrangement of Fig. 8, the surfaces are provided with notches 22 which are separated by inclined faces 23 so as to form in effect raised edges which oppose movement of the spikes in a direction unseating the socket member from the bone structure.

The socket member constructed as described above is further finished by rounding the edges and giving the inner surface of the shell a high mirror polish.

The success of the socket member as herein described in the rehabilitation of a ball and socket joint is dependent in a large measure upon the skill of the surgeon and the utilization of unique tools or instruments by which proper manipulation and placement of the member into the socket or acetabulum may be accomplished, as described more fully in my copending application Serial No. 594,403, filed June 28, 1956, covering Placement Means for Hip Socket, which constitutes a division of the present application.

In rehabilitating a joint by the use of the socket member of the present invention, the joint elements are separated by disarticulating the joint, and the osteophytes or barnacles thereon are removed by techniques well known to the surgeon. During this process, the socket is fitted to the ball, after which the appropriate tools are utilized for placement of the socket member in the proper position in the acetabulum, and to prepare the bone structure to receive the anchor spikes.

With the socket member 14 in place, the ball 12 is replaced within the socket member and the joint restored to normal cooperative relationship of the parts.

As so arranged, a stable joint structure is effected in which the resulting stresses are applied to the joint elements in a natural manner, and in which the cotyloid notch provides natural lubrication to the joint through the notch 16 of the socket member 14.

Since the spikes 19 are integrally formed with the socket shell 15, there is no possibility of the anchor means becoming loosened by vibration, and the socket member will remain fixed permanently in the acetabulum.

It is appreciated that various modifications may suggest themselves to those skilled in the art without departing from the spirit of my invention, and, hence, I do not wish to be restricted to the specific form shown or uses mentioned, except to the extent indicated in the appended claims.

I claim:

1. Socket means for a hip joint, comprising: a generally cup-shaped member adapted to fit into the acetabulum of a hip bone to receive the head of an associated femur, said member having integrally formed bone entering anchor means adapted to be simultaneously driven into the adjacent bone structure concurrently with the placement of said member, whereby the member is retained in a fixed seated position of placement.

2. Socket means for a hip joint, comprising: a generally cup-shaped member adapted to fit into the acetabulum of a hip bone to receive the head of an associated femur, said member having a wall opening adapted to be aligned with a cotyloid notch of the acetabulum; and means carried by said member and adapted to enter the adjacent bone structure in response to the movement of said member to a seated position of placement, whereby the member is retained against unseating movement.

3. Socket means for a hip joint, comprising: a generally hemispherical shell defining a socket member adapted to fit into the acetabulum of a hip bone to receive the head of an associated femur, said member having integrally formed projections adapted to be positioned in the adjacent hip bone structure for retaining the member in a fixed seated position of placement, said projections having parallel axes and being simultaneously positioned with the placement of said member.

4. Socket means for a hip joint, comprising: a generally hemispherical shell defining a socket member adapted to fit into the acetabulum of a hip bone to receive the head of an associated femur, said shell having an opening conforming generally to the configuration of and adapted to register with the cotyloid notch of the acetabulum; and means carried by said member for simultaneously entering the adjacent bone structure concurrently with the placement of said member for securing said member in a fixed anchored seated position of placement and retaining it against movement in an unseating direction.

5. As an article of manufacture: a generally cup-shaped socket member adapted to fit into the acetabulum of a hip bone to receive the head of an associated femur; and an integrally formed mounting spike projecting from the outer surface of said member and adapted to extend into the adjacent bone structure and anchor the member in seated position.

6. As an article of manufacture: a generally cup-shaped socket member adapted to fit into the acetabulum of a hip bone to receive the head of an associated femur; and a plurality of tapered spikes projecting from the outer surface of said member adapted to be positioned in the adjacent bone structure and retain the member in a fixed seated position of placement in the acetabulum.

7. As an article of manufacture: a generally cup-shaped socket member adapted to fit into the acetabulum of a hip bone to receive the head of an associated femur; and a plurality of tapered spikes projecting from the outer surface of said member adapted to be positioned in the adjacent bone structure and retain the member in a fixed seated position of placement in the acetabulum; said spikes being similarly radially spaced from the central axis of the socket at equal angular spaced positions about said central axis.

8. As an article of manufacture: a generally cup-shaped socket member adapted to fit into the acetabulum of a hip bone to receive the head of an associated femur; and three integrally formed external spikes projecting from the bottom of said member to provide anchors adapted to enter the adjacent bone structure and retain the member in seated operative position, said spikes having their longitudinal axes in parallel relation to the central axis of the socket, and being circumferentially spaced at 120 degree intervals about said central axis.

9. The combination in a body joint, having articulate ball and socket elements, of a cup-shaped socket member interposed between the normally engageable surfaces of the confronting faces of said ball and socket elements; and means anchoring said member against relative movement with respect to one of said elements, said member having a cutout portion providing a passage for admitting natural joint lubricant secretions between cooperative surfaces of said member and the relatively movable element.

10. The method of rehabilitating a hip joint which comprises fixedly anchoring a generally cup-shaped socket lining in the acetabulum to form an artificial surface of engagement with the associated rounded head of the femur, and conducting natural lubricants to said artificial surface of engagement through a passage in said lining having communication with the cotyloid notch of the acetabulum.

References Cited in the file of this patent

UNITED STATES PATENTS

| | | |
|---|---|---|
| 2,181,746 | Siebrant | Nov. 28, 1939 |
| 2,645,220 | Gallant et al. | July 14, 1953 |
| 2,668,531 | Haboush | Feb. 9, 1954 |
| 2,679,245 | Timmermans | May 25, 1954 |
| 2,718,228 | Van Steenbrugghe | Sept. 20, 1955 |

FOREIGN PATENTS

| | | |
|---|---|---|
| 837,294 | Germany | Apr. 21, 1952 |
| 1,047,640 | France | July 22, 1953 |

OTHER REFERENCES

Journal of the International College of Surgeons for August 1941, pg. 292. (Copy in Science Library.)

Bickham's Operative Surgery, published in 1924, vol. 2, pages 368–369. (Copy in Scientific Library.)